US012770958B2

(12) United States Patent
Hermle et al.

(10) Patent No.: US 12,770,958 B2
(45) Date of Patent: Oct. 20, 2026

(54) HEAT CONDUCTING ELEMENT FOR TRANSFERRING HEAT AWAY FROM A BATTERY SYSTEM

(71) Applicant: Airbus (S.A.S.), Blagnac (FR)

(72) Inventors: Frank Hermle, Aying (DE); Stephan Friedl, Bad Wiessee (DE)

(73) Assignee: Airbus (S.A.S.), Blagnac (FR)

( * ) Notice: Subject to any disclaimer, the term of this patent is extended or adjusted under 35 U.S.C. 154(b) by 649 days.

(21) Appl. No.: 18/203,403

(22) Filed: May 30, 2023

(65) Prior Publication Data

US 2023/0395898 A1 Dec. 7, 2023

(30) Foreign Application Priority Data

Jun. 2, 2022 (EP) .................................... 22176991

(51) Int. Cl.
*H01M 10/6569* (2014.01)
*B60L 58/26* (2019.01)
(Continued)

(52) U.S. Cl.
CPC ......... *H01M 10/6569* (2015.04); *B60L 58/26* (2019.02); *H01M 10/052* (2013.01);
(Continued)

(58) Field of Classification Search
CPC ........... H01M 10/6569; H01M 10/613; H01M 10/625; H01M 10/052; B60L 58/26;
(Continued)

(56) References Cited

U.S. PATENT DOCUMENTS 5,325,913 A * 7/1994 Altoz ...................... F28D 15/06 165/41
9,689,624 B2 6/2017 Timmons
(Continued)

FOREIGN PATENT DOCUMENTS

NO 20110364 A1 9/2012
WO 8905952 A1 6/1989

OTHER PUBLICATIONS

Stokes, "Structure, Properties, and Applications of Plastics", Introduction to Plastics Engineering, First Edition., 247-252 (Year: 2020).*

(Continued)

*Primary Examiner* — Armindo Carvalho, Jr.
(74) *Attorney, Agent, or Firm* — KDW Firm PLLC

(57) ABSTRACT

A heat conducting element for transferring heat away from a heat producing device includes a heat pipe or vapor chamber with a hollow structure that has at least one opening that reaches from outside the hollow structure into the interior of the hollow structure. The opening is sealed by a meltable material, so the interior of the hollow structure is fluid-tight, wherein inside the interior a working fluid in form of a saturated liquid and its vapor is provided for receiving, transferring and dissipating heat. The heat conducting has a predetermined operating temperature range with a minimum operating temperature and a maximum operating temperature. The meltable material has a predetermined melting temperature that exceeds the maximum operating temperature by a predetermined temperature difference, such that the meltable material melts if the hollow structure is exposed to a temperature that reaches the melting temperature to unseal the at least one opening.

20 Claims, 1 Drawing Sheet

(51) Int. Cl.
*H01M 10/052* (2010.01)
*H01M 10/613* (2014.01)
*H01M 10/625* (2014.01)

(52) U.S. Cl.
CPC ....... *H01M 10/613* (2015.04); *H01M 10/625* (2015.04); *B60L 2200/10* (2013.01); *H01M 2220/20* (2013.01)

(58) Field of Classification Search
CPC ...... B60L 2200/10; F28D 15/02; F28D 15/04; F28D 15/06; H01L 23/427; H01L 23/4275; H01L 2924/0002
See application file for complete search history.

(56) References Cited

U.S. PATENT DOCUMENTS

| | | | | |
|---|---|---|---|---|
| 2016/0104925 A1* | 4/2016 | Xiang | ............... | H01M 10/6551 429/82 |
| 2022/0006158 A1* | 1/2022 | Ninomiya | ........... | H01M 50/293 |

OTHER PUBLICATIONS

European Search Report for Application No. 22176691 dated Oct. 25, 2022.

* cited by examiner

HEAT CONDUCTING ELEMENT FOR TRANSFERRING HEAT AWAY FROM A BATTERY SYSTEM

TECHNICAL FIELD

The disclosure herein relates to a heat conducting element for transferring heat away from a heat producing device, a battery system as well as a vehicle having such a battery system and/or at least one such heat conducting element.

BACKGROUND

Large battery systems require thermal management to maintain battery cells in a desired, optimal operating temperature range. For example, due to the finite efficiency of battery cells, a certain power loss occurs and leads to the generation of heat, which needs to be dissipated. The sufficient heat dissipation is an enabler of high power densities, as required in aerospace applications. Also, the cell temperatures have a considerable influence on the service life and battery safety. For achieving a sufficient heat dissipation, a good connection of the battery cells to a cooling system is advantageous.

A wide variety of cooling techniques are known for battery cooling, which include air-cooled and liquid-cooled battery designs. The thermal connection of the battery cells to a cooling system has an influence on the overall weight and safety of the battery system. Heat pipes are highly effective thermal conductors, have a low weight and allow a safe leakage-free operation. Furthermore, a heat pipe also ensures temperature equalization between the battery cells, which is advantageous in normal operation. The thermal behavior of individual cells must be controllable and locally higher temperatures must remain isolated. Since heat pipes would equalize temperatures between battery cells, their use is hardly possible.

SUMMARY

It is thus an object of the disclosure herein to propose an alternative battery cell cooling device or a heat conducting element that uses a highly effective thermal conductor comparable to a heat pipe but does not spread higher local temperatures from one battery cell to another.

This object is met by a heat conducting element having features disclosed herein. Advantageous embodiments and further improvements are disclosed in the following description.

A heat conducting element for transferring heat away from a heat producing device is proposed, the heat conducting element having a heat pipe or a vapor chamber with a hollow structure, wherein the hollow structure has at least one opening that reaches from outside the hollow structure into the interior of the hollow structure, wherein the at least one opening is sealed by a meltable material, such that the interior of the hollow structure is fluid-tight, wherein inside the interior a working fluid in form of a saturated liquid and its vapor is provided for receiving, transferring and dissipating heat, wherein the heat conducting element has a predetermined operating temperature range with a minimum operating temperature and a maximum operating temperature, and wherein the meltable material has a predetermined melting temperature that exceeds the maximum operating temperature by a predetermined temperature difference, such that the meltable material melts if the hollow structure is exposed to a temperature that reaches the melting temperature to unseal the at least one opening.

The heat conducting element according to the disclosure herein provides the ability of receiving heat, transferring it from a first point on the heat conducting element to a second point and to dissipate it through a heat dissipating device attached to the second point. For example, the conducting element may be connected to a heat producing device, such as a battery, receive its heat and conduct it away from the heat producing device along the heat conducting element to a heat dissipation device connected to the conducting element installed in a distance to the heat producing device.

The heat conducting element is mainly based on a heat pipe or a vapor chamber with a hollow structure. The heat pipe or vapor chamber utilizes a phase transition of a volatile liquid inside the hollow structure of the heat conducting element. A volatile liquid, which is also referred to as a working fluid, is selected depending on the predetermined operating temperature range, which in turn depends on the kind of heat producing device, to which the conducting element will be connected. Selecting a suitable working fluid is crucial. The working fluid shall be able to evaporate even at the minimum operating temperature and it shall be able to condense even at the maximum operating temperature. For example, the working fluid may be ammonia, methanol, ethanol, or water.

The heat conducting element according to the disclosure herein may also be based on the so-called "Variable Conductance Heat Pipe" (VCHP), which realizes variable cooling with combined gas fillings. This may exemplarily be used to allow a warm-up of systems so that the heat transfer function only starts at a certain working temperature. The working fluid may thus include a mixture of several known working fluids if desired.

If a section of the heat conducting element is heated, the working fluid absorbs heat and vaporizes locally, such that the vapor pressure in the hollow structure is increased. The latent heat of the vaporization absorbed by the working fluid reduces the temperature at the respective heated section. At a section where a heat dissipating device is arranged, the equilibrium vapor pressure is smaller. This pressure differential drives a vapor transfer to the heat dissipating device, where the vapor condenses and releases its latent heat to the heat dissipating device. The liquid created through condensation flows back to the heated section and is available for further evaporation and condensation cycle.

For working properly, the hollow structure must be sealed. According to the disclosure herein, the hollow structure comprises at least one opening, through which vapor could exit the hollow structure. To prevent this, the at least one opening is sealed, i.e. closed in a fluid-tight manner, through a meltable material. The melting temperature of the meltable material is selected in a way that the meltable material melts if a previously selected critical temperature at the at least one opening is reached. If the meltable material melts, the at least one opening is unsealed and the heat pipe process is interrupted. Due to the pressure inside the heat pipe or vapor chamber, the meltable material may be blasted away once it starts to melt and the vapor from inside the hollow structure is discharged. The working fluid quickly exits from the hollow structure and thus the heat transfer through the working fluid ends.

The critical temperature is selected depending on the respective application of the heat conducting element. For example, an operating temperature range for the heat conducting element defines a safe temperature range, in which the heat conducting element operates and in which the respective heat producing devices, which are connected to the heat conducting element, can be operated. Once a critical temperature is reached, i.e. through an excessive temperature of a single one of a plurality of heat producing devices, the meltable material melts and the function of the heat conducting element is stopped.

The heat pipe or the vapor chamber itself represents an isothermal element. In it, the same temperature substantially prevails at every point. Thus, if the heat conducting element is attached to a battery system with a plurality of battery cells, the heat conducting element ensures an equalization of the temperatures of all battery cells that are connected, which is advantageous for the normal operation of the battery system. Furthermore, it is thus not particularly important for the above-described shutdown mechanism where the at least one opening and the meltable material are located, as the internal temperature of the heat conducting element is substantially the same everywhere and at a sufficiently high temperature will lead to a melting of the meltable material. Depending on the design and heat transfer, however, it may not be preferred to place the meltable material directly in the area of a heat sink.

The use of a heat conducting element according to the disclosure herein is particularly advantageous for the integration into a battery system having several battery cells. If one of the cells experiences a temperature runaway, with a conventional heat pipe or vapor chamber heat would simply be transferred to the other, normally operating battery cells, after which they may experience an undesired condition. However, according to the disclosure herein, the other battery cells are reliably protected. The heat conducting element according to the disclosure herein has a reliable, maintenance-free passive protection for preventing spreading heat from one heat producing device with a temperature runaway to other heat producing devices with normal operating temperatures.

In an advantageous embodiment, the meltable material is a solder or a thermoplastic material. The solder may be a soft solder with a low melting point. For example, the solder may comprise an alloy of Tin and Bismuth, wherein the amount of Bismuth allows to adjust the melting temperature. Of course, other solder may be feasible and this is merely an example. On the other hand, thermoplastic materials, such as very low density polyethylene, may have a very low melting temperature of about 120° C. The selection and adjustment of the melting temperature is done depending on the respective application of the heat conducting device.

In an advantageous embodiment, the meltable material has a predetermined melting temperature in a range of 100° C. to 140° C., preferably 110° C. to 130° C. and most preferably in a range of 115° C. to 125° C. This is particularly beneficial for battery systems having battery cells based on Lithium. In particular, the melting temperature may be approximately 118° C.

In an advantageous embodiment, the hollow structure is an elongated element with the interior enclosed by a metallic pipe, wherein the hollow structure has a first end and a second end, and wherein the at least one opening is arranged at the first end and/or the second end. The metallic pipe may exemplarily be made from copper or aluminum. Copper is often used for water based heat pipes or vapor chambers. However, aluminum may be a feasible selection for ammonia based heat pipes or vapor chambers. When selecting the metallic material, it is beneficial to also focus on the thermal conductivity and compatibility with the working fluid, since not all metallic materials appear to be suitable for all working fluids. When selecting the metallic material, it may also be considered that if the heat pipe or vapor chamber is opened and thus loses its functionality, then the thermal conductivity of the metallic material still remains. Thin cross-sections and low thermal conductivity are then advantageous to prevent an excessive heat spreading. Therefore, heat pipes or vapor chambers made of stainless steel may also be of interest, even if the heat cannot be coupled as well through the material wall here. Providing at least one opening at a single end of the hollow structure allows to arrange heat producing devices in the vicinity of the at least one opening. It is beneficial to place the at least one opening at an end opposite to a heat sink, e.g. a cooling device.

The use of a single opening and just one section with a meltable material may be sufficient to ensure the function of the heat conducting element. In case an individual shutdown of one battery cell in case of overtemperature is required or desired and for maintaining a continuous cooling for the other battery cells a plurality of independent heat conducting elements may be used for each battery cell or each of several groups of battery cells, wherein each of the independent heat conducting elements comprises an opening and a meltable material to seal it. A collective heat pipe or vapor chamber may thermally connect the individual heat conducting elements to use the advantages described above to full capacity. For the sake of completeness, the use of a plurality of openings is not ruled out and may as well be realized.

In an advantageous embodiment, the heat conducting element is designed to continuously transfer heat in an orientation-independent manner. Thus, the heat conducting element may be installed and operated in a vehicle, which may repeatedly change its spatial orientation and which repeatedly accelerates in different directions. A heat pipe or vapor chamber may exemplarily comprise a wick structure at an inner surface of the hollow structure exerting a capillary action on the liquid phase of the working fluid.

In an advantageous embodiment, the hollow structure comprises a plurality of heat introduction interfaces designed to be thermally connected to a plurality of battery cells or other heat producing devices. The heat introduction interfaces may simply be a sufficient installation space for heat coupling elements, with which the heat conducting element is connectable to the respective battery cells. However, a certain surface structure, a profile or other means may be provided.

In an advantageous embodiment, the hollow structure comprises a heat dissipation interface at a distance to the at least one opening. The heat dissipation interface is dedicated for attaching a cooling device, such as cooling fins, an active cooling apparatus or any other means that is capable of receiving heat from the heat conducting element and dissipating it. As mentioned above it is preferred that the at least one opening is arranged at a side of the heat conducting element, where heat is introduced.

In an advantageous embodiment, the heat dissipation interface and the at least one opening are arranged at opposite ends of the hollow structure. Consequently, the heat conducting element connects to distanced geometric locations, wherein in one location heat producing devices, such as battery cells, are provided and wherein in the other location a heat dissipation device is arranged.

The disclosure herein further relates to a battery system, comprising a plurality of battery cells, a cooling device and at least one heat conducting element according to the above description, wherein the plurality of battery cells are thermally connected to the at least one heat conducting element, which is coupled with the cooling device. The working fluid may particularly be water in combination with a copper-based hollow structure. However, ammonia as a working fluid in combination with an aluminum-based hollow structure would be suitable.

In an advantageous embodiment, the battery cells are Lithium based. The battery cells may be solid-state Lithium-ion battery cells having a polymer electrolyte. Of course, other variants are possible and this is merely an example. Lithium-ion battery cells usually comprise a narrow operating temperature range, which influences the service life and cycle stability of the battery cells.

In an advantageous embodiment, the cooling device and the battery cells are arranged at opposite ends of the heat conducting element. For example, the battery cells may be thermally connected to a central cooling system in a vehicle, wherein a heat exchanger is connected to an end of the heat conducting element opposite the battery cells.

In an advantageous embodiment, the at least one opening is arranged in a region directly adjacent to the battery cells. Thus, an immediate interruption of the function of the heat conducting element is provided if one of the battery cells experiences a temperature runaway.

The disclosure herein also relates to a vehicle, having a battery system according to the above and/or a heat conducting element according to the above.

In an advantageous embodiment, the vehicle is an aircraft, for example a commercial or transport aircraft. The use of a battery system equipped with the heat conducting element according to the disclosure herein allows to provide an exceptionally reliable prevention of excessive heat transfer between battery cells, but allows a highly effective heat transfer to a cooling device in normal operation.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements. They show.

DETAILED DESCRIPTION

Figure 1:
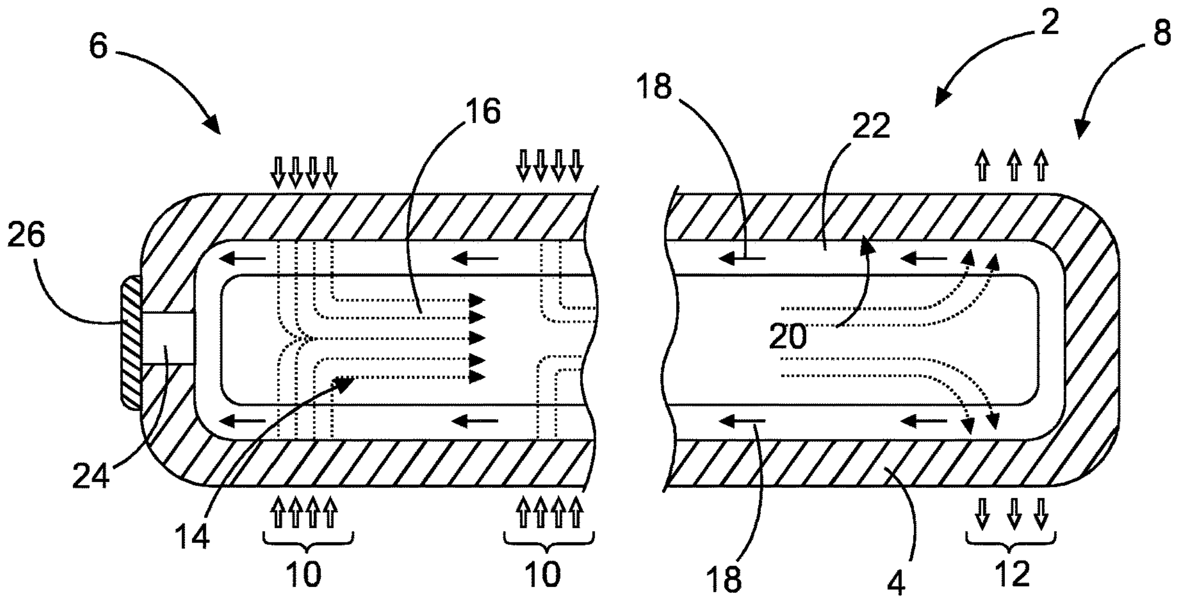
FIG. 1 schematically shows a heat conducting element in a sectional view.

FIG. 1 shows a heat conducting element 2 for transferring heat. Here, the heat conducting element 2 is designed in the form of a heat pipe having a hollow structure 4, which is exemplarily realized in the form of a metallic tube or pipe. The hollow structure 4 comprises a first end 6 and a second end 8. At the first end 6, a plurality of heat introduction interfaces 10 are indicated, which are to be understood as sections of the heat conducting element 2, where a heat producing device is thermally connected to transfer heat into the heat conducting element 2. The heat is indicated in the form of arrows with double bar. At the second end 8, a heat dissipation interface 12 is provided, where heat is transferred into a heat dissipating device, which is not shown herein.

In an interior space 14 of the heat conducting element 2, a working fluid is provided in the form of a saturated liquid and its vapor. Essentially, the interior space 14 does not comprise any further gases or substances. Heat that enters the heat conducting elements 2 at the heat introduction interfaces 10 is evaporated and vapor 16 is created. As the vapor pressure inside the hollow structure 4 increases and since the equilibrium vapor pressure is smaller at the heat dissipating interface 12, the vapor 16 is driven towards the second end 8. Here, the vapor condenses and releases its latent heat to the heat dissipation device. Afterwards, the condensed working fluid in the form of liquid 18 travels back to the first end 6. At an inner surface 20 of hollow structure for, a wick structure 22 is provided, which ensures the transport of the liquid 18 irrespective of the spatial orientation of the hollow structure 4.

At the first end in vicinity to the heat introduction interfaces 10, an opening 24 is provided. The opening 24 connects the interior space 14 to the surrounding of the hollow structure 4, but is sealed by a meltable material 26, which is arranged at the outer side of the hollow structure 4 and completely covers the opening 24. Thus, vapor 16 and liquid 18 cannot exit the interior space 14 and air or other fluids or substances cannot enter the interior space 14 from the outside, when the meltable material 26 is in place.

The melting point of the meltable material 26 is selected in a way that a predetermined critical temperature rising at one of the heat introduction interfaces 10 leads to melting the meltable material 26, which interrupts the working function of the heat conducting element 2 in an instant. If a temperature runaway of a heat producing device connected to one of the heat introduction interfaces 10 occurs with the opening 24 being sealed, the heat would also be transferred to the other heat introduction interfaces 10, which may affect the heat producing devices arranged at these other heat introduction interfaces 10. However, when the meltable material 26 melts upon the excessive heat, heat conduction is abruptly interrupted and the other heat producing devices are protected from overheating.

The position of the opening 24 is arbitrarily shown. It is preferred to place the opening 24 near the heat introduction interfaces 10 or away from a heat sink. However, further openings 24 may also be provided, but are not required for the shutdown function described.

The hollow structure 4 may be a metallic material, such as copper, aluminum or stainless steel, and has a good heat conductivity to provide a sufficient heat transfer into the interior space 14. The kind of working fluid depends on the desired operating temperature range of the heat producing devices, to which the heat conducting element 2 is connected. For example, water or ammonia may be suitable for battery applications.

Figure 2:
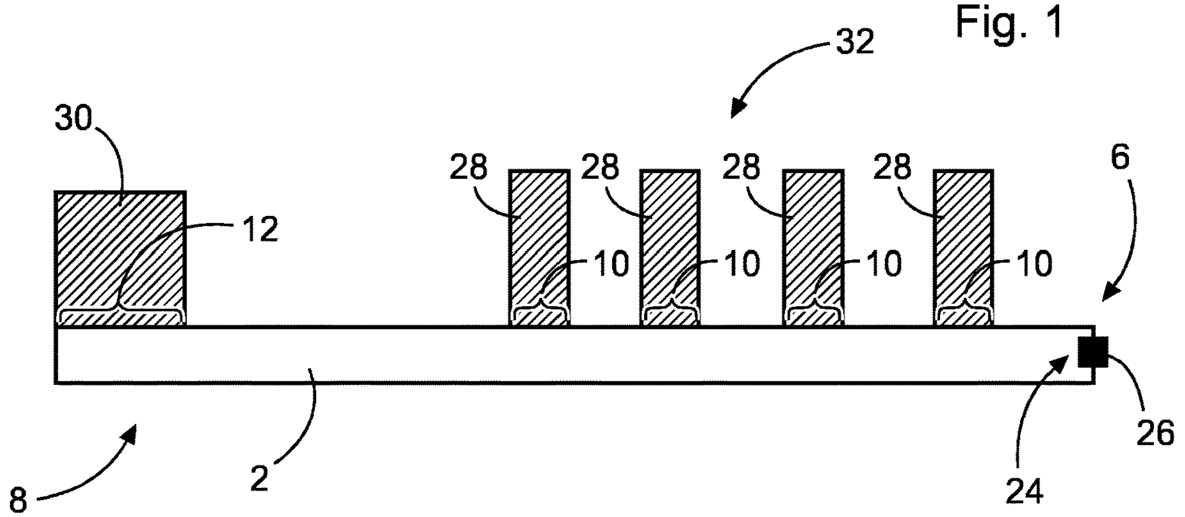
FIG. 2 schematically shows the heat conducting element with battery cells and a heat sink attached to it.

FIG. 2 shows the heat conducting element 2 with a plurality of battery cells 28 in thermal connection to the heat introduction interfaces 10. At the second end 8, a heat sink in form of a heat dissipation device 30 is provided. This arrangement constitutes a battery system 32, wherein the battery cells 28 may comprise Lithium. By using the heat conducting element 2, overheating of the battery cells 28 is protected even if one of the battery cells 28 may experience a temperature runaway. It may also be feasible to design the heat conducting element 2 as a flat vapor chamber, onto which multiple rows and columns of battery cells 28 may be attached.

Figure 3:
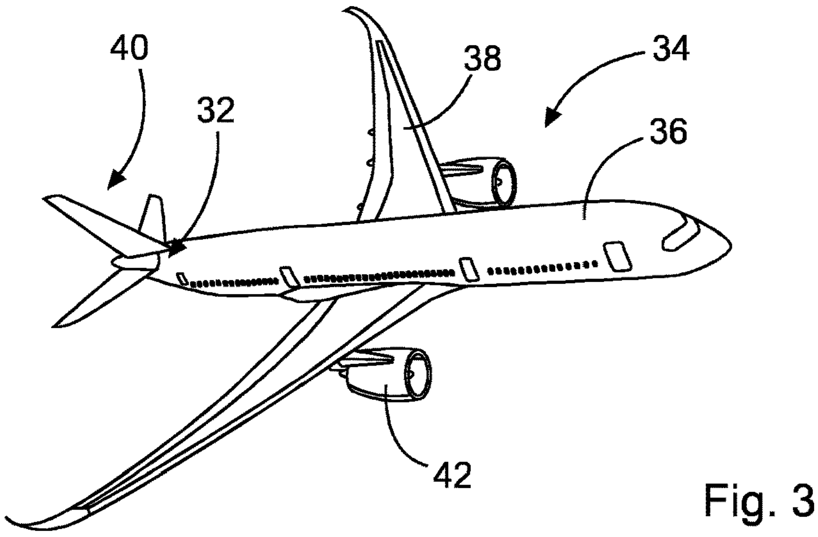
FIG. 3 shows an aircraft.

FIG. 3 shows an aircraft 34 having a fuselage 36, wings 38, a tail plane 40 and engines 42. The battery system 32 may be arranged in the vicinity of the tail plane 40 and the heat dissipation device 30 may be connected to a central cooling system or may be realized as a standalone cooling device. The battery system 32 may further comprise at least one sensor arranged at the battery cells 28 and/or the heat conducting element 2 to detect the thermal conditions of the battery cells 28. This allows to switch off the battery system 32, i.e. separate it from an electric circuit inside the aircraft 34, once the meltable material 26 is melted and the heat conducting element 2 is inoperable.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS

- 2 heat conducting element
- 4 hollow structure
- 6 first end
- 8 second end
- 10 heat introduction interface
- 12 heat dissipation interface
- 14 interior space
- 16 vapor
- 18 liquid
- 20 inner surface
- 22 wick structure
- 24, 24*a*, 24*b*, 24*c* opening
- 26 meltable material
- 28 battery cell
- 30 heat dissipation device
- 32 battery system
- 34 aircraft
- 36 fuselage
- 38 wing
- 40 tail plane
- 42 engine

The invention claimed is:

1. A battery system, comprising:

a plurality of battery cells;

at least one heat conducting element that is thermally connected to the plurality of battery cells for transferring heat away from the plurality of battery cells, the heat conducting element having a heat pipe or a vapor chamber with a hollow structure;

wherein the hollow structure has at least one opening that reaches from outside the hollow structure into an interior of the hollow structure;

wherein the at least one opening is sealed by a meltable material, such that the interior of the hollow structure is fluid-tight;

wherein, inside the interior of the hollow structure, a working fluid in a form of a saturated liquid and vapor is provided for receiving, transferring, and dissipating heat;

wherein the heat conducting element has a predetermined operating temperature range, with a minimum operating temperature and a maximum operating temperature, and wherein the meltable material has a predetermined melting temperature that exceeds the maximum operating temperature by a predetermined temperature difference;

wherein, during operation within the predetermined operating temperature range, the heat pipe or vapor chamber transfers heat between the plurality of battery cells to equalize temperatures of the plurality of battery cells; and wherein, when the hollow structure is exposed to a temperature that is a same as or greater than the melting temperature, the meltable material melts to unseal the at least one opening, such that the working fluid is discharged from the hollow structure and heat transfer through the working fluid is terminated, thereby interrupting heat transfer between the plurality of battery cells.

2. The battery system according to claim 1, wherein the meltable material is a solder.

3. The battery system according to claim 1, wherein the meltable material has a predetermined melting temperature in a range of 100° C. to 140° C.

4. The battery system according to claim 1, wherein:

the hollow structure is an elongated element with an interior enclosed by a metallic material;

the hollow structure has a first end and a second end; and the at least one opening is at the first end and/or the second end.

5. The battery system according to claim 1, wherein the hollow structure is configured to continuously transfer heat in an orientation-independent manner.

6. The battery system according to claim 1, wherein the hollow structure comprises a plurality of heat introduction interfaces configured to be thermally connected to a plurality of battery cells.

7. The battery system according to claim 1, wherein the hollow structure comprises a heat dissipation interface at a distance to the at least one opening.

8. The battery system according to claim 7, wherein the heat dissipation interface and the at least one opening are at opposite ends of the heat conducting element.

9. The battery system according to claim 1, wherein the at least one heat conducting element is coupled with a cooling device.

10. The battery system according to claim 1, wherein the plurality of battery cells are lithium based.

11. The battery system according to claim 9, wherein the cooling device and the plurality of battery cells are at opposite ends of the heat conducting element.

12. The battery system according to claim 1, wherein the at least one opening is in a region directly adjacent to the plurality of battery cells.

13. A vehicle having the battery system according to claim 1.

14. The vehicle according to claim 13, wherein the vehicle is an aircraft.

15. The battery system according to claim 1, wherein the meltable material has a predetermined melting temperature in a range of 110° C. to 130° C.

16. The battery system according to claim 1, wherein the meltable material has a predetermined melting temperature in a range of 115° C. to 125° C.

17. The battery system according to claim 1, wherein the meltable material is a thermoplastic material.

18. The battery system according to claim 1, wherein the heat pipe or vapor chamber is isothermal.

19. The battery system according to claim 1, wherein melting of the meltable material and termination of heat transfer through the working fluid prevents propagation of heat from a battery cell of the plurality of battery cells that has reached the predetermined melting temperature to another battery cell of the plurality of battery cells.

20. The battery system according to claim 1, wherein:

melting of the meltable material is triggered by one or more battery cells of the plurality of battery cells undergoing a thermal runaway condition; and termination of heat transfer through the working fluid prevents transfer of heat from the one or more battery cells undergoing the thermal runaway condition to at least one other battery cell of the plurality of the battery cells.

* * * * *